June 23, 1931. H. C. BOSTWICK 1,811,453
APPARATUS FOR THE MANUFACTURE OF INNER TUBES
Filed March 29, 1927  3 Sheets-Sheet 1
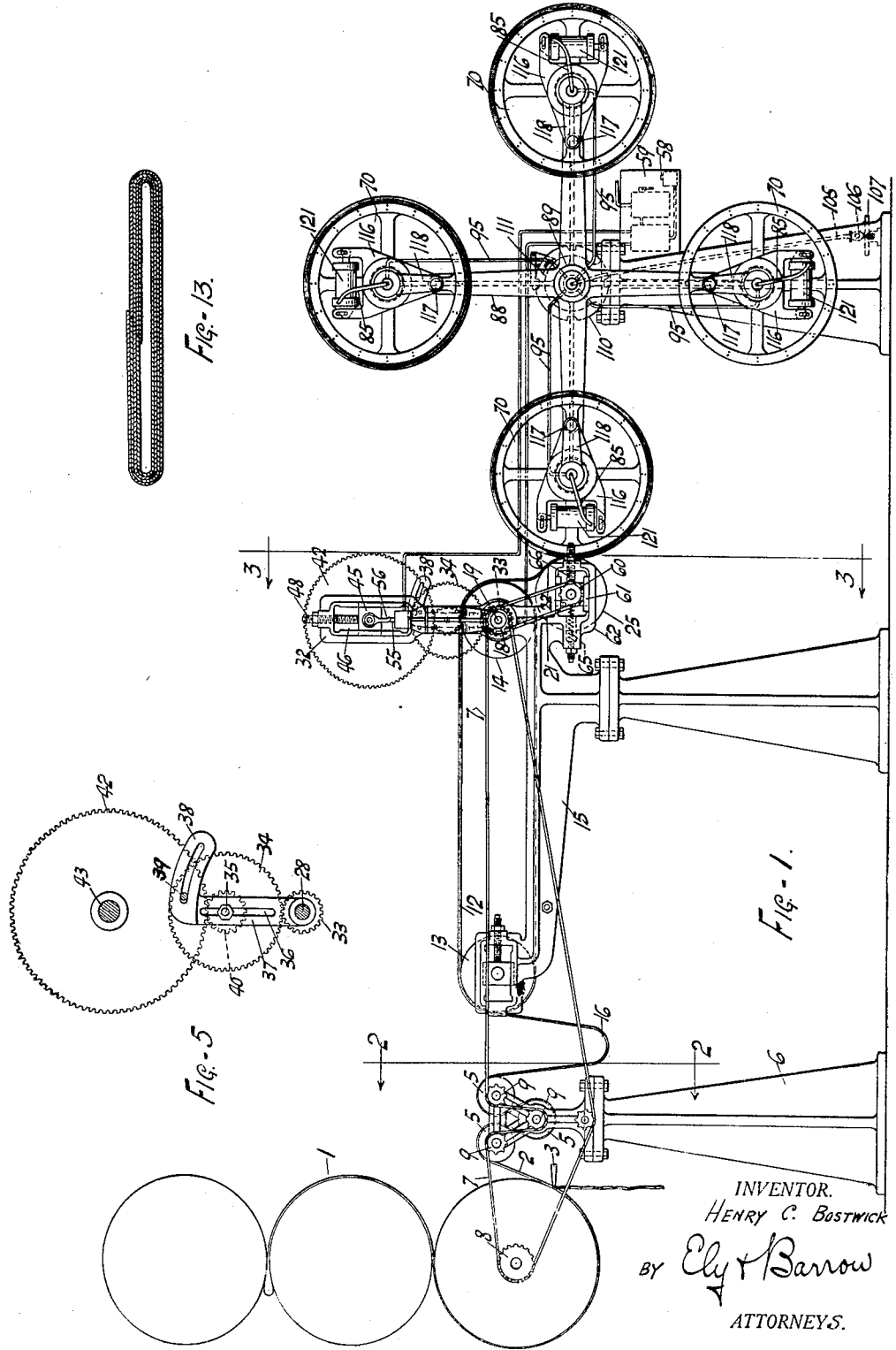
INVENTOR.
HENRY C. BOSTWICK
BY Ely & Barrow
ATTORNEYS.

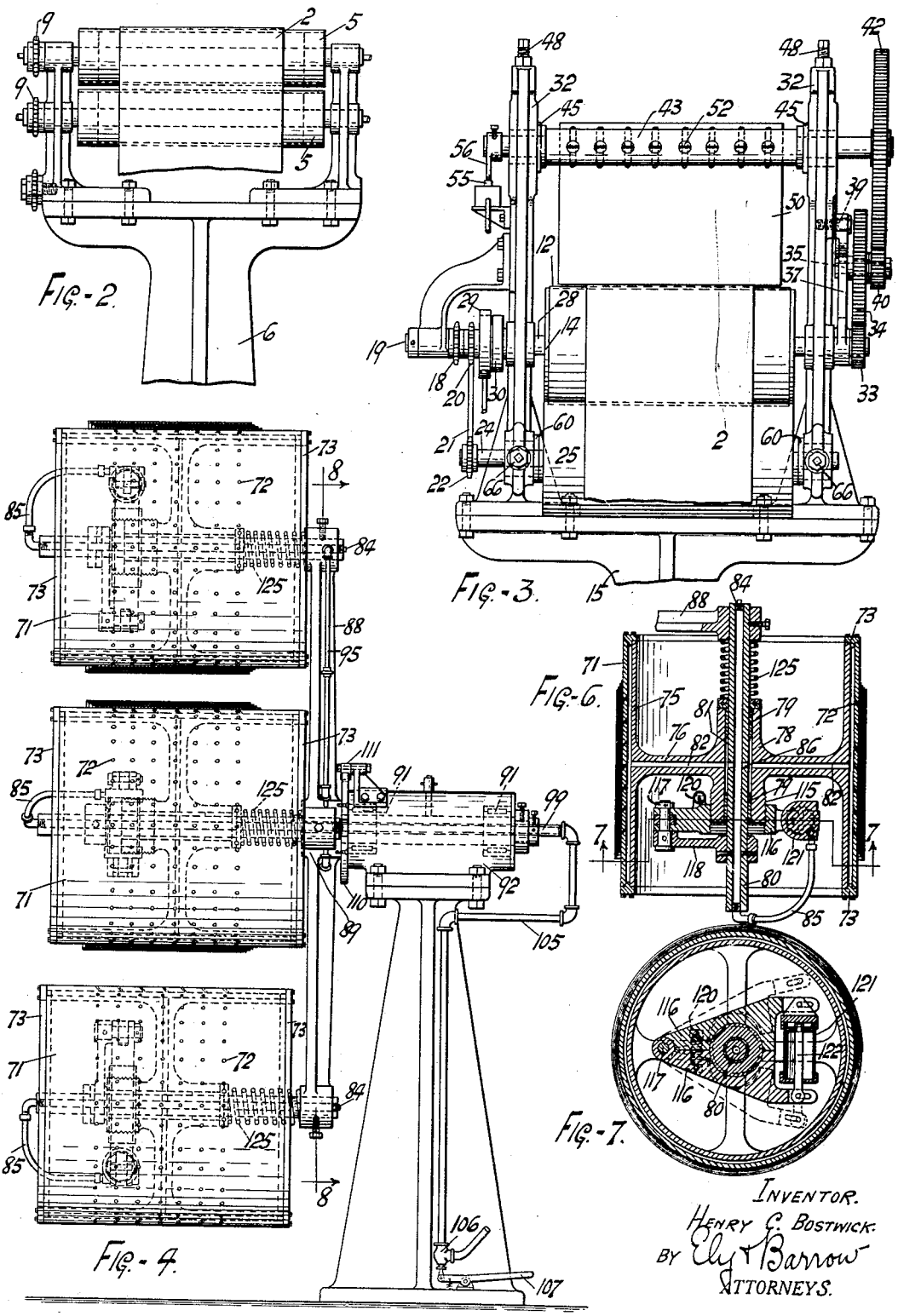

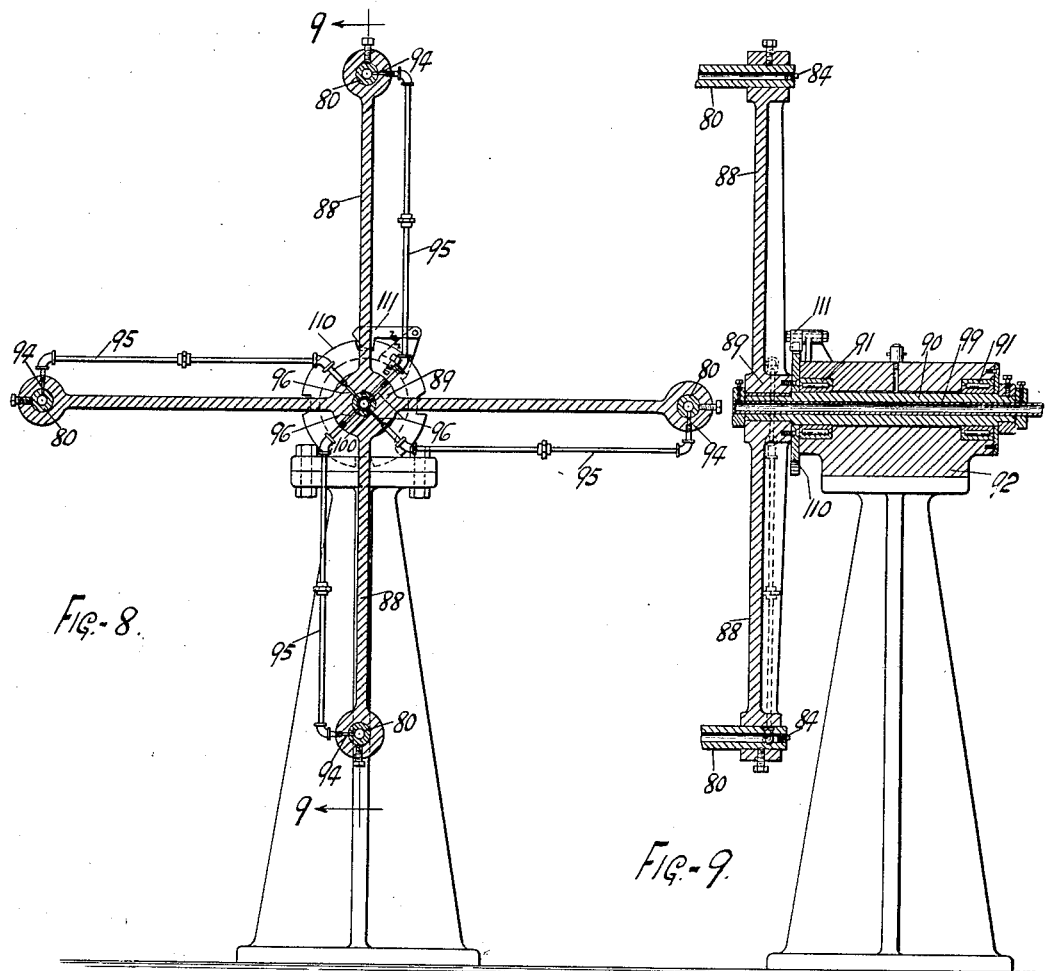

Patented June 23, 1931

1,811,453

UNITED STATES PATENT OFFICE

HENRY C. BOSTWICK, OF KENMORE, OHIO, ASSIGNOR TO THE AKRON STANDARD MOLD COMPANY, OF AKRON, OHIO, A CORPORATION OF OHIO

APPARATUS FOR THE MANUFACTURE OF INNER TUBES

Application filed March 29, 1927. Serial No. 179,274.

This invention relates to an apparatus for use in the manufacture of inner tubes for pneumatic tires. The particular objects of the invention are to lower the cost of manufacture of inner tubes by constructing the tube directly from calendered rubber stock or sheeting as it issues from the usual rubber calender, thus avoiding handling the rubber between the calender to the tube making machine. This also produces tubes of superior quality.

The invention relates to an improved apparatus for producing stock from calendered rubber sheeting from which a tube can be manufactured.

Briefly described, the apparatus performs the operations of sheeting of the rubber stock on the calender, cooling the sheeted stock, and winding it directly upon drums or forms so as to form a cylinder or blank. In the operation of forming the cylinder, the sheet is rolled upon a drum which is gradually fed transversely of the cylinder so as to step-off or taper the edges of the blank. When the tube is constructed from the cylinder, the stepped-off edges are brought together and an inclined seam or splice is obtained.

Other and auxiliary steps and operations will be more fully described in the specification, it being understood that the principal object of the invention is the manufacture of an endless band of rubber, suitable for subsequent formation into a tube, by passing the stock directly from the calender to the blank-making apparatus, thereby eliminating the objectionable and expensive liners which are required where the tube stock is handled in accordance with present practices. The advantages and ends to be gained by the use of the invention will be apparent to those skilled in this art and it will be understood that, having explained the invention and the preferred embodiment thereof as known to me at the present time, improvements and changes therein may be suggested to those skilled in the art to which this invention appertains. Such changes, modifications or improvements as fairly come within the scope of the invention as set forth in the claims are intended to be covered herein.

In the drawings in which is illustrated the machine for carrying out the process:

Figure 1 is a side elevation of a complete unit for the manufacture of the endless bands or blanks;

Figure 2 is a side view of the cooling rolls, being a section taken on the line 2—2 of Figure 1;

Figure 3 is a side view of the feeding rolls for the sheet material, being a section taken on the line 3—3 of Figure 1;

Figure 4 is an end view of the spider for supporting the various drums;

Figure 5 is an enlarged view of the speed changing gears on the feeding rolls;

Figure 6 is a longitudinal section of one of the drums;

Figure 7 is a cross-section on the line 7—7 of Figure 6;

Figure 8 is a section on the line 8—8 of Figure 4 showing the piping connections for the various drums;

Figure 9 is a section on the line 9—9 of Figure 8;

Figure 10 is an enlarged cross-section of a drum;

Figure 11 is a detail of the drum;

Figure 12 is an enlarged view of the air inlet to the various drums; and

Figure 13 is a view showing the manner in which a tube is formed from the cylinder as it is constructed upon the machine.

In the drawings, an ordinary three-roll calender, such as used for sheeting rubber stock, is shown diagrammatically at 1, the rubber which is heated by the calender issuing in the form of a sheet 2 and being cut to proper width by knives 3 held in contact with the lower roll of the calender. From the calender the sheeted stock of the proper width and thickness is led over a plurality of cooling rolls 5 which are chilled by circulation of water through the journals of the rolls supported in an upright 6. The rolls are driven at the same surface speed as the calender by a chain 7 passing over a sprocket 8 on one of the calender rolls and over sprockets 9 on the shafts of the cooling rolls.

From the cooling rolls, which reduce the temperature of the stock to a workable degree, the sheet rubber passes on to an endless supporting belt 12 which passes over an adjustable idler pulley 13 and a driven pulley 14 mounted in a frame 15. The pulley 14 and the conveyor belt are driven intermittently, but in the operation of the machine the total surface movement of the belt is substantially equal to the amount of rubber sheeting delivered by the calender, the surplus, accumulating between each operation of the conveyor belt, being stored in a loop 16 between the cooling rolls and the belt. The belt is driven from the calender by means of the chain 7 which passes over a sprocket 18 on the short shaft 19 mounted in alignment with the axis of the drum 14. Attached to the sprocket 18 is a second sprocket 20 from which a chain 21 passes to a sprocket 22 on the shaft 24 of a stitcher or pressure roller 25, the purpose and functions of which will be described later.

The belt is operated at slightly higher surface speed than the calender rolls and is stopped intermittently while a knife severs a length of rubber sufficient to make a complete cylinder for the manufacture of a tube. This is accomplished by mounting the drum 14 on a shaft 28 in alignment with the shaft 19, the meeting ends of the shaft being provided with magnetic clutch members 29 and 30. The shaft 28 extends through the two supporting standards 32 and carries at its far end a pinion 33 which meshes with a large gear 34 on a stub shaft 35. The shaft 35 is adjustably secured in a slot 36 formed in a bracket 37 pivoted upon the shaft 28 and having an arcuate slotted tailpiece 38 which is fixed in adjusted position by a bolt 39 passing into the standard 32. A smaller gear 40 fixed to the gear 34 meshes with a large gear 42 fixed to the end of a knife shaft 43 supported in the upper end of the standard 32. The shaft 43 is carried in vertically adjustable bearing blocks 45 mounted in ways 46 formed in the standards 32 and adjusted by screw shafts 48. The gearing which has been described permits a large range of adjustment for securing an accurate rotation of the knife shaft to cut off the required length of rubber sheeting to make the cylinders of various diameters.

Attached to the shaft 43 is a knife blade 50 secured in position by bolts and slots 52 so that the knife may be accurately adjusted to enter into and sever the stock, regardless of the gearing adjustment.

When the cut has been made, it is desirable to stop the feeding movement of the belt until the end of the severed strip has been wound upon the cylinder forming drum and until a new drum has been placed in position. This is accomplished by disconnecting the device from the drum through the magnetic clutch 29—30 which is controlled by a button 55 in the path of an arm 56 on the end of the shaft 43. After the cylinder has been rolled and the new drum placed in position, the operator again engages the clutch by pressing a button 58 on a conveniently located control board 59, whereupon the belt resumes the feeding of the sheeted rubber.

From the end of the belt the stock passes downwardly to the roller 25 which has been previously described. This roller is mounted in bearings 60 which slide in horizontal guideways 61 formed in a bracket 62 depending from the frame 15. The bearings 60 are urged to the right, as shown in Figure 1, by springs 65, the extent of forward movement being determined by adjustable stops 66 at the ends of the guideways.

The roller 25 bears against one of a plurality of forming cylinders or drums which are brought against it in rotation by the mechanism now to be described.

The drums, which may be of any desired number, here shown as four, are all identical and one only will be described. A drum is indicated by the numeral 70 and comprises an outer cylindrical shell which is provided with a plurality of small vents or ports 72 which are formed diagonally of the shell so that air discharged through all of the ports will be directed toward the free end of the shell. To the ends of the shell are secured side plates 73 having centrally formed ribs 74 against which the shell 71 is positioned. Spaced from the shell 71 by the rib 74 is a solid interior shell or casing 75 with which is integrally formed a supported spider 76, the arms of which radiate from an elongated hub 78. The hub is fixed to two spaced collars 79 located at either end of the hub which slide and rotate upon a central drum shaft 80. The collars afford an open chamber 81 about the shaft with which passageways 82 communicate leading to the space between the inner and outer shells.

The shaft 80 is hollow, being closed at one end by a plug 84 and at the other end communicating with a supply pipe 85 for supplying air under pressure to the interior of the shaft. Passages 86 conduct the air under pressure to the chamber 81 from where it is conducted to the outer surface of the drum in the manner described.

Each shaft 80 is fixed on the end of an arm 88, which arms radiate from a central hub 89. This hub is fixed to a hollow shaft 90 which is rotatably mounted in bearings 91 in the upper end of a stationary support 92. The interior of the hollow shafts 80 communicate by passageways 94 and piping 95 with passageways 96, through the hub 89 and the shaft 90, to the interior of the shaft 90. A pipe 99 is mounted in the hollow shaft 90, one end of the pipe being connected with a pressure supply line 105. The end of the pipe 99 is provided with a single passage 100 which is arranged to be in register with one of the passageways 96 when the spider formed by the arm 88 is brought to a position of rest. As shown in Figure 1, the drum at the position opposite to the pressing or stitcher roller is in position where the air passages are open from the source of supply to the exterior of the drum. When the drum is in this position, it is desired to move the completed cylinder from the drum, which is done by opening a valve 106 in the pressure line 105 by means of a foot treadle 107. This admits air under pressure to the inside of the rubber cylinder upon the drum, and as the jets or blasts of air are directed at an angle to the face of the drum, the air blasts will expand the rubber cylinder slightly and blow it off the drum.

In order to insure that the drums will be in register with the pressure roller 25 and the air ports in register, as shown in Figure 12, the hub 89 has fixed to the inner side thereof a notched disk 110 and on the support 92 is pivotally mounted a spring actuated detent 111 which engages each notch in the disk 110 and thereby arrests the movement of the spider at the proper point. The notches may be slightly inclined at one side and the end of the latch beveled slightly to permit the rotation of the drum supporting spider without lifting the latch out of engagement with the notches.

It is one of the objects of the invention to wind the sheet of rubber on a slight spiral so that the edges of the band are stepped-off as shown in Figures 6 and 13. This method of forming the band of rubber secures a lap joint when the edges are brought together in making the tube from the band formed upon the drum.

In order to accomplish this purpose, the drum is fed transversely of the axis of the rubber sheet as it is delivered by the roller 25. It is possible to accomplish this result in a number of different ways, that shown in the accompanying drawings being preferred. Each of the hubs 78 is formed with a screw-threaded portion 115 which is engaged by a split nut 116 formed by two pivoted jaws mounted upon a pin 117 within the drum and at one side of the central shaft. The pin 117 is carried in the outer end of an arm 118 fixed upon the shaft. The two jaws of the split nut are drawn together by a heavy coil spring 120 and are forced apart by means of a pressure cylinder 121 in the outer ends of the jaw, the cylinder being pivoted to one of the jaws and the piston 122 pivoted to the other jaw. Air under pressure is admitted to the cylinder through the pipe 85 which has been previously described. It will be observed that as the drum is rotated in winding up the band of rubber by contact with the continuously rotated stitcher roller 25, the nut, which is then in engagement with the screw-threaded end of the hub, will cause the drum to travel across the line of feed of the rubber in the direction of the spider until the blank is built up to the proper thickness. As the drum moves toward the spider, it compresses a coil spring 125 surrounding the shaft 80 between the hub 78 and the end of the arm 88. As the rubber is stripped from the drum, air, which has been admitted under pressure to the interior of the shaft to strip the blank from the drum, will also force the piston 122 outwardly of the cylinder, opening up the split nut and permitting the energy stored in the spring 125 to move the drum over until it contacts with the arm 118 at starting position.

The operation of the apparatus will be readily understood from the description which has been given, it being necessary only to restate briefly the several steps in the process.

The sheet of rubber as it leaves the calender is cut to the proper width by the knives 3 and the strip passes over the cooling rolls and on to the belt 12, a storage supply of the sheet rubber being obtained between the cooling rolls and the end of the belt. The belt is driven through the magnetic clutch at the proper speed to convey the sheet of rubber on to the pressure or stitching roller 25. When the proper length has passed, the knife 50 will sever the end of the strip and the belt will be stopped. The roller 25, however, continues to revolve and lays the sheet of rubber upon the rotating drum which is in contact therewith. While the sheet rubber is being fed on the drum, it is being gradually stepped-off so as to obtain the effect of a skived edge. When the drum is filled, the operator rotates the spider to bring a new drum into proper relationship and starts the feeding of the stock by pressing the button 58. When the filled drum reaches the position to be stripped, the operator turns on the air pressure in the line 105 and the air admitted between the drum and the band stretches the band and moves it off the end of the drum. At the same time the split nut is opened and the drum moves back, under the influence of the spring 125, to starting position. To complete the inner tube from the blank, the tube maker folds the edges of the blank over until the edges abut, rolls the seam tightly together and the tube is completed. In making the seam, it is preferred to have the edges overlap slightly so as to insure a slightly greater thickness of rubber at the seam. The tube is then ready to be vulcanized in the usual manner in a tube mold, it being understood that the valve stem and pad are inserted in the tube at any convenient time.

What is claimed is:

1. An apparatus for forming cylindrical blanks for use in the manufacture of inner tubes, comprising the combination of a calender, cooling rolls and a belt driven from the calender, the rubber stock passing over the instrumentalities in succession, a cutter for severing the stock, a pressure roller, and a forming drum in contact with the pressure roller.

2. An apparatus for forming cylindrical blanks for use in the manufacture of inner tubes, comprising the combination of a calender, cooling rolls and a conveyor driven from the calender, a pressure roller also driven from the calender, a cutter for severing the stock at fixed intervals, a drum held in contact with the pressure roller, and means for shifting the drum transversely of the pressure roller while the stock is being wound thereon.

3. An apparatus for forming cylindrical blanks for use in the manufacture of inner tubes, comprising the combination of a calender, a drum and a pressure roller in contact therewith, the sheeted rubber passing directly from the calender to the pressure roller by which it is applied to the drum, and means for shifting the position of the drum relative to the line of feed of the sheeted rubber, said means including a split nut fixed at the axis of said drum and adapted to cooperate with threads on the hub of the drum.

4. An apparatus for forming cylindrical blanks for use in the manufacture of inner tubes, comprising the combination of a calender, a drum and a pressure roller in contact therewith, the sheeted rubber passing directly from the calender to the pressure roller by which it is applied to the drum, means for shifting the position of the drum relative to the line of feed of the sheeted rubber, and a movable support for the drum by which it may be shifted away from the pressure roll when the required length of sheeting has been wound thereon.

5. An apparatus for forming cylindrical blanks for use in the manufacture of inner tubes, comprising the combination of a calender, a drum and a pressure roller in contact therewith, the sheeted rubber passing directly from the calender to the pressure roller by which it is applied to the drum, means for shifting the position of the drum relative to the line of feed of the sheeted rubber, and means independent of the drum rotating means for returning the drum to its starting position.

6. An apparatus for forming cylindrical blanks for use in the manufacture of inner tubes, comprising the combination of a calender, a drum and a pressure roller in contact therewith, the sheeted rubber passing directly from the calender to the pressure roller by which it is applied to the drum, means for shifting the position of the drum relative to the line of feed of the sheeted rubber, a movable support for the drum by which it may be shifted away from the pressure roll when the required length of sheeting has been wound thereon, and means for returning the drum to its starting position.

7. In an apparatus for the uses set forth, the combination of a calender, a drum, means for conducting a sheet of rubber directly from the calender to the drum, a measuring and cutting device between the calender and the drum, and means for rotating the drum and pressing the rubber in contact therewith.

8. In an apparatus for the uses set forth, the combination of a calender, a drum, means for conducting a sheet of rubber directly from the calender to the drum, a measuring and cutting device between the calender and the drum, means for rotating the drum and pressing the rubber in contact therewith, and means for shifting the drum across the stock during the feeding operation.

9. In an apparatus for the uses set forth, the combination of a calender, a drum, means for conducting a sheet of rubber directly from the calender to the drum, a measuring and cutting device between the calender and the drum, means for rotating the drum and pressing the rubber in contact therewith, means for shifting the drum across the stock during the feeding operation, and means for returning the drum to its first position.

10. In an apparatus for the uses and purposes set forth, the combination of a calender, a drum, means for conducting a sheet of rubber directly from the calender to the drum, a measuring and cutting device between the calender and the drum, a movable support for the drum, and means to strip the cylindrical blank from the drum.

11. In an apparatus for the uses and purposes set forth, the combination of a calender, a drum, means for conducting a sheet of rubber directly from the calender to the drum, a measuring and cutting device between the calender and the drum, a pressure roller in contact with the drum, means to move the drum out of contact with the pressure roller after the sheet of rubber has been wound thereon, and means to strip the cylindrical blank from the drum.

12. In an apparatus for the uses and purposes set forth, the combination of a calender, a drum, means for conducting a sheet of rubber directly from the calender to the drum, a measuring and cutting device between the calender and the drum, a pressure roller in contact with the drum, means to shift the drum across the sheet, means to move the drum out of contact with the pressure roller after the sheet of rubber has been wound thereon, and means to strip the cylindrical blank from the drum.

13. In combination, a calender, a drum, means to feed a sheet of sufficient length to encircle the drum a plurality of times directly from the calender to the drum, means for shifting the drum transversely of the sheet during the winding operation, and means to strip the cylinder thus formed from the drum, said means including passages for compressed air in the periphery of the drum.

14. In combination, a source of supply for a sheet of rubber, a drum, means to cut off a length of sheet rubber sufficient to encircle the drum a plurality of times, means to roll the sheet about the drum, and means to strip the cylinder thus formed from the drum.

15. In combination, a source of supply for a sheet of rubber, a drum, means to cut off a length of sheet rubber sufficient to encircle the drum a plurality of times, means to roll the sheet about the drum, means to shift the drum laterally of the sheet during the rolling operation, and means to strip the cylinder thus formed from the drum.

16. In combination, a source of supply for a sheet of rubber, a drum, a movable support for the drum, a pressure roller in contact with the drum, means to feed a measured length of sheet rubber sufficient to encircle the drum a plurality of times between the drum and the pressure roller, automatically operated shifting means for moving the drum transversely of the sheet during the rolling operation, and means to strip the cylinder thus formed from the drum.

17. In combination, a calender, cooling rolls and a belt conveyor, the said instrumentalities being driven from the calender and in timed relation thereto, a knife operating to cut a given length of the sheet as it is delivered by the calender through the cooling rolls and onto the belt, and a drum on which the strip of material from the belt is wound.

18. In combination, a calender, cooling rolls and a belt conveyor, the said instrumentalities being driven from the calender and in timed relation thereto, a knife operating to cut a given length of the sheet as it is delivered by the calender through the cooling rolls and onto the belt, a drum on which the strip of material from the belt is wound, and a pressure roller in contact with the drum.

19. In combination, a calender, cooling rolls and a belt conveyor, the said instrumentalities being driven from the calender and in timed relation thereto, a knife operating to cut a given length of the sheet as it is delivered by the calender through the cooling rolls and onto the belt, a drum on which the strip of material from the belt is wound, a pressure roller in contact with the drum, and means to shift the drum transversely of the sheet rubber during the winding operation.

20. In a machine for the uses and purposes set forth, a belt for delivering a sheet of rubber, a rotating spider, a pressure roller, a plurality of drums on the spider, each drum being brought into contact with the roller at intervals to receive a sheet of the rubber delivered by the belt, and means to shift the drum transversely of the sheet.

21. In a machine for the uses and purposes set forth, a belt for delivering a sheet of rubber, a rotating spider, a pressure roller, a plurality of drums on the spider, each drum being brought into contact with the roller at intervals to receive a sheet of the rubber delivered by the belt, means to shift the drum transversely of the sheet, and means for stripping the cylinder of rubber from a drum when occupying a position remote from the pressure roller.

22. A machine for the uses and purposes set forth, comprising a belt for supporting a length of rubber, a knife for cutting definite lengths of sheet rubber upon the belt, a pressure roller to receive the cut and measured strip, a drum about which the pressure roller wraps the sheet of rubber, a movable support for holding the drum in contact with the roller, and means to strip the cylinder of rubber so formed from the drum after it is removed from the pressure roller.

23. A machine for the uses and purposes set forth, comprising a belt for supporting a length of rubber, a knife for cutting definite lengths of sheet rubber upon the belt, a pressure roller to receive the cut and measured strip, a drum about which the pressure roller wraps the sheet of rubber, a movable support for holding the drum in contact with the roller, means to shift the drum transversely of the sheet of rubber during the winding operation, and means to strip the cylinder of rubber so formed from the drum after it is removed from the pressure roller.

HENRY C. BOSTWICK.